Sept. 29, 1970　　　　　J. J. BROODMAN　　　　　3,531,619
PROCESS FOR POWDER SHIELD OR GAS-SHIELD ARC WELDING WITH A
CONSUMABLE ELECTRODE Filed Oct. 25, 1968　　　　　　　　　　　　　　　　4 Sheets-Sheet 1

INVENTOR
JOHANNES J. BROODMAN
BY Henry A. Margallo Jr.
ATTORNEY

United States Patent Office 3,531,619
Patented Sept. 29, 1970

3,531,619
PROCESS FOR POWDER SHIELD OR GAS-SHIELD ARC WELDING WITH A CONSUMABLE ELECTRODE
Johannes Jacobus Broodman, Breskens, Netherlands, assignor to N.V. Koninklijke Maatschappij "De Schelde," Vlissingen, Netherlands
Filed Oct. 25, 1968, Ser. No. 770,667
Claims priority, application Netherlands, Oct. 27, 1967, 6714667
Int. Cl. B23k 9/00
U.S. Cl. 219—137                                          17 Claims

ABSTRACT OF THE DISCLOSURE

A process for powder shielded or gas shielded arc welding of plates and/or shapes in a single pass by means of a consumable electrode. A groove is provided between the elements to be welded, having an upper V-portion and an adjoining lower abutting portion. An electric arc is fired between the electrode and the groove while varying the welding current according to a predetermined curve with alternating intervals of high and low current intensity during movement of the electric arc along the groove.

---

The following material is retyped in order to verify the recitations appearing on the upper portion of pages 2-12 of the specifications:

FIELD OF THE INVENTION

The invention relates to a process for powder shield or gas-shield arc welding with a consumable electrode in one operation, more specifically a process for welding from one side of heavy sheets with a thickness of more than 25 mm. in which a butt joint is effected.

DESCRIPTION OF THE PRIOR ART

In the conventional welding method of the above-mentioned type, the maximum thickness of the sheets to be welded is about 25 mm. if the welding operation is carried out in one operation. The method according to the invention makes it possible to weld considerably thicker sheets from one side with a single consumable electrode in one operation.

Greater units in shipbuilding have resulted in the use of thicker sheets. The process according to the invention is therefore particularly suitable for welding of heavy sheets of shipsections, so that the frequent turning of the aforesaid sections is avoided.

In Japan a process is widely used in which several arcs are placed one behind the other at a short distance from each other, the so-called tandemwelding, for welding heavy sheets to about 40 mm., on an extensive scale. Said process being more efficient than the powder shield welding with subsequent layers.

It has been found that the maximum sheet thickness to be welded is about 40 mm. in one operation with two subsequent consumable electrodes. The weld of the first arc completely penetrates the seam and fills the lower part of it, the second arc fills the remaining part of the seam. In this process, a V-weld with an opening angle of 45° and a vertical remaining part at the bottom of the weld of 2 mm. is commonly used, the penetrated fured portion can be sustained in a great many ways, for instance, by means of a copper support.

A disadvantage of the aforesaid process is the great weld contents which necessitates much heat to be brought into the material as well as considerable difference in width between the lower and upper part of the weld causing great contraction stresses to occur in the material.

In addition to this, the welding equipment is more complicated because it is imperative to have two separate current sources for two electrode input devices, one current source supplying direct current and the other alternating current.

It is known that the results of the powder shield welding with a single wire are mainly determined by the welding current. The remaining length of the welding data, like arc voltage, travelling speed current conducting, part of the consumable electrode and the diameter of the electrode are secondary.

It is also known that in the conventional welding method of the above-mentioned type, adverse effects may occur, such as heat cracks in the longitudinal direction of the weld, when the ratio between the depth and width of the weld is more than 1.

Experiments have shown that the width of the weld at the upper side roughly equals the welding current to the power 2.2 and that the depth of penetration of the weld in the sheet roughly equals the welding current to the power 1.3, all this when using a single consumable electrode. The great difference in width in welding of the above-mentioned type, introduces shrink stresses and side effects, like the shape of the solidification fronts in the weld, because of which heat crack may occur limiting the feasibility of the conventional process.

The width of a weld does not present any difficulties by itself, when said weld has a symmetrical configuration which may be obtained, for instance, in the electrogas or electroslag welding, where very great sheet thicknesses are attained in one operation.

SUMMARY OF THE INVENTION

The above-mentioned drawbacks are avoided in the process according to the invention, which is characterized in that the workpieces are placed against each other with the remaining vertical part of the seam to be welded, and that the welding current is varied according to a determined curve with alternating intervals of high and low current intensity during the travelling of the electric arc over the workpiece, in which process an alternate formation of the weld is effected, the lower vertical, remaining part of the weld during the interval with high current intensity and the upper part of the weld during the interval with low current intensity.

It may be started from the conventional apparatus for powder shield welding with a single consumable electrode which may be supplied to the arc in the form of a wire, for instance. When welding two flat sheets together, for instance, the machine travels along the joint in an even way by means of a trolley.

The preparation of the seam will preferably be a V-seam with vertical sides, which may be provided with a slight advance opening, depending on the tube sheet thickness, when welding heavy sheets together.

During the change in current intensity from the interval with high intensity to the low interval, the solidification pattern, in the joint being welded, follows the arc travelling to the upper part of the seam, because of which the solidification-front is directed upwards.

The loss in volume due to the shrinking is filled up by the melting bath travelling upwards. Impurities find a ready way up and are not enclosed by the solidifying material.

The so-called heat cracking occurring when there is a too great height-depth ratio in the welding seam is avoided in the process according to the invention.

The frequency and the distribution of the intervals with high and low current intensity are determined by the welding speed, the sheet thickness, the kind of material and the preparation of the workpieces.

If the arc has changed its position sufficiently and is near the edge of the melting bath, formed during the preceding interval with high current intensity, there follows again an interval with high current intensity.

Current peaks with steep leading edges are preferred to obtain a maximum effect of the high current intensity on the penetration of the seam.

In the system with constant wire supply rate, the length of the arc, and with it the arc voltage, will reach a period of high value in the interval with high current intensity. This signifies that a temporarily greater deposit occurs until the arc balance has been reached. If the interval with high current is reached in a very short time, there is little or no detrimental affect caused by the extra molten material in the weld seam, due to the inertia in the fusing of the electrode, as regards the fusing of the material.

Because of this, the heat supplied to the material is limited to an even greater extent.

In the process according to the invention the material supplied to the weld seam is considerably limited as compared with the conventional process with, for instance, equal sheet thickness. The total amount of heat per unit of length of the weld is considerably reduced by it, causing a further increase in shrink stresses and mechanical properties of the weld to occur.

It is possible in principal to obtain in various ways current peaks for carrying out the process according to the invention.

Preferably a power source for direct current is used with, for instance, a decreasing welding characteristic. In using alternating current, the current peaks for obtaining a similar welding penetration will be higher in comparison with direct current.

In using a power source with decreasing voltage-current curve the electrode material is fed to the arc at a constant speed, for instance, in the form of a wire. The current peaks are now obtained by varying the power source in such a way that a higher current intensity occurs with a matched arc resistance. The variable impedance of the power source can be realized, for instance, by means of a transductor control, or, for instance, by a serial resistance in the feed cables which is periodically short-circuited.

When the installation has been provided with a so-called constant potential power source, current peaks may be obtained by varying the electrode supply rate. A greater supply rate results in a lower arc and a higher current intensity.

When using the method with constant wire supply rate, the arc voltage will increase during the interval with high current intensity. When using the method with the variable wire supply rate, the arc voltage will decrease during the interval with high current intensity. The latter method enables a deeper penetration to occur. Because the influence of the arc voltage is of secondary importance and the variations are slight, and because the effect is partly wiped out by the greater amount of deposits when using the variable power supply, neither system is preferably to the other.

In the latter case, the maximum result to be obtained is determined by the inertia of the electrode supply system.

A great advantage in welding sheets with one arc, with respect to known method with several arcs the process after a temporary interruption can be started again. Restarting welding with several subsequent arcs presents specific problems. The weld has to be specially prepared before restarting and the ignition of the arcs has to be timed at carefully chosen interdependent intervals.

The invention will now be elucidated further with reference to the drawings.

DESCRIPTION OF THE PREFERRED EMBODIMENT

Figure 1:
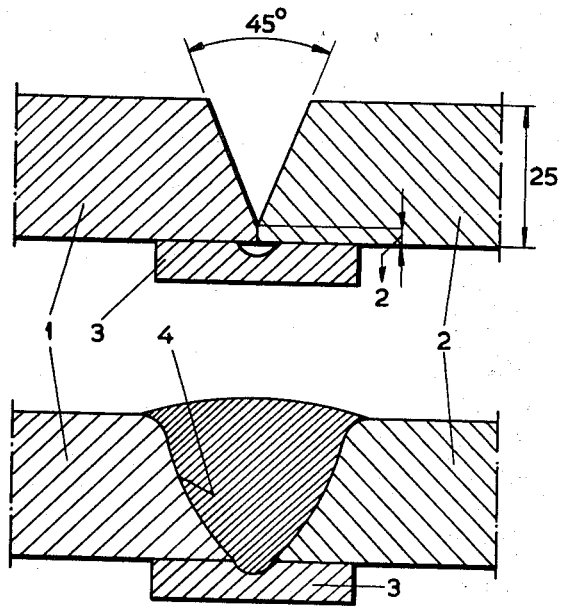
FIG. 1 shows a welding preparation and the form of a weld, respectively, of the conventional type for welding together sheets having a thickness of 25 mm. with one electrode.

FIG. 1 shows at the top, a preparation of a weld seam and at the bottom, the final situation in welded condition for a known method. The opening angle is 45° and the remaining part of the V-seam has a length of 2 mm.

The support 3 at the reverse side of the sheets 1 and 2 prevents the weld from sagging. The contour 4 shows the form of the weld, in which it is clearly shown that the width is greater than the depth.

Figure 2:
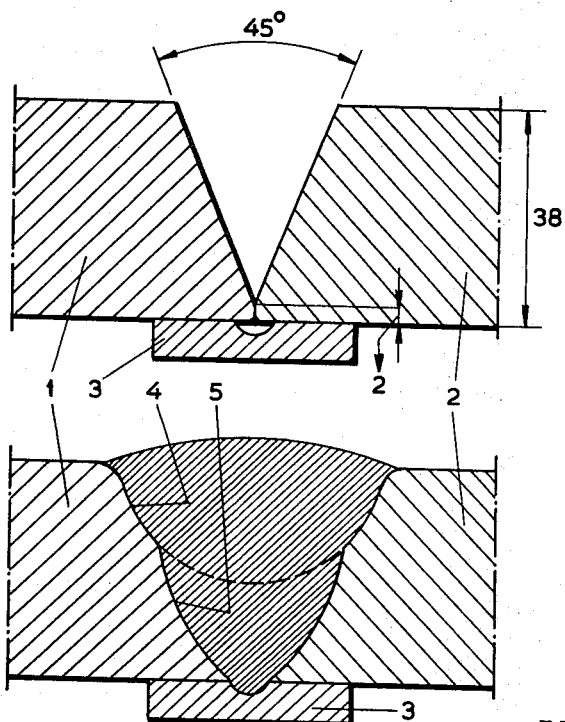
FIG. 2 shows a welding preparation and the form of a weld of the conventional type, respectively after welding sheets with a thickness of 40 mm. with two electrodes in tandem.

FIG. 2 also shows the prepared condition at the top and the welded condition at the bottom for a known welding method with subsequent electrodes. Contour 5 shows the part of the weld formed by the electrode travelling ahead, and 4 shows the contour of the part of the weld formed by the electrode following at a short distance.

Figure 3:
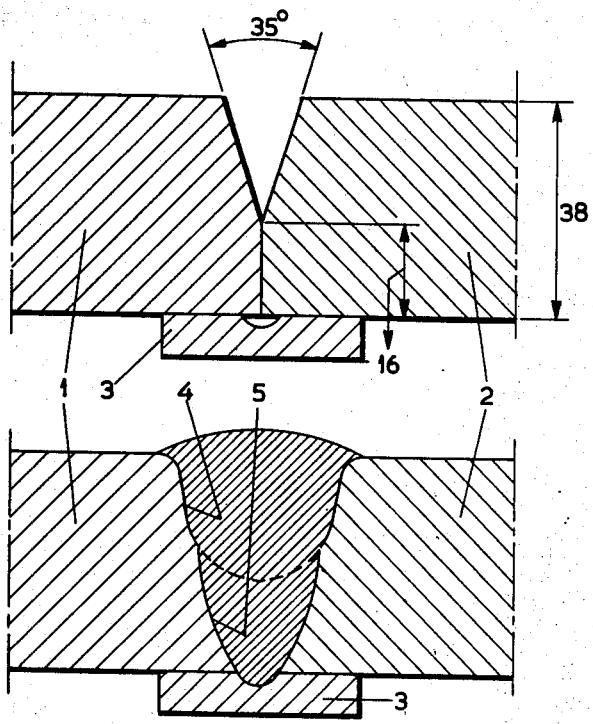
FIG. 3 shows a welding preparation and form of a weld obtained with the method of the present invention.

FIG. 3 shows a preferred embodiment of a weld preparation according to the invention in the upper part of the figure and the form of a weld obtained according to the process of the invention. A particular feature is the large remaining part of the V-seam and the extraordinarily small filling of the portion of the seam with angular opening of 35°. The contours 4 and 5 show the parts of the weld which are effected with the low and high current intensity, respectively. For comparative purposes the welding data are following hereafter for welding for instance a sheet with a thickness of 36 mm. according to the conventional method with two arcs in tandem, and the process according to the invention.

According to the first method the welding current of the first arc amounts to 1600 amperes and that of the second arc 1380 amperes, while the arc voltages amount to 33 and 35 volts respectively. The travelling speed of the arcs amounts to 20 cm./min. and the diameter of the electrode is 6.4 and 7.9 mm. respectively.

By the process according to the invention the welding current intensity amounts for instance to 1000 amperes during the low interval and the arc voltage amounts to about 32 volts. During the high interval the welding current intensity amounts for instance to 2200 amperes and the arc voltage to a maximum of 45 volts, the travelling speed is 20 cm./min., the electrode diameter is 6.3 mm. The proportion between the interval with high current intensity and low current intensity is 0.8. The high interval being taken from the starting point of the peak to the point of stabilization at the low level.

The repetition rate is 0.4 period per second. Taking into account the speed in rise of the leading edges, the average current intensity may be calculated at about 1450 amperes. In the conventional method 2980 amperes are used in total for producing a welded joint between sheets equalling in thickness. As has already been stated, a very much larger amount of molten material is the result thereof and a very wide weld with all the detrimental effects pertaining pertaining to it. By reducing the supply of material and heat to a considerable extent, in the process according to the invention, sheets with a much greater thickness, up to 10 cm. and more, can be welded with good welding results at a considerably reduced cost.

Figure 4:
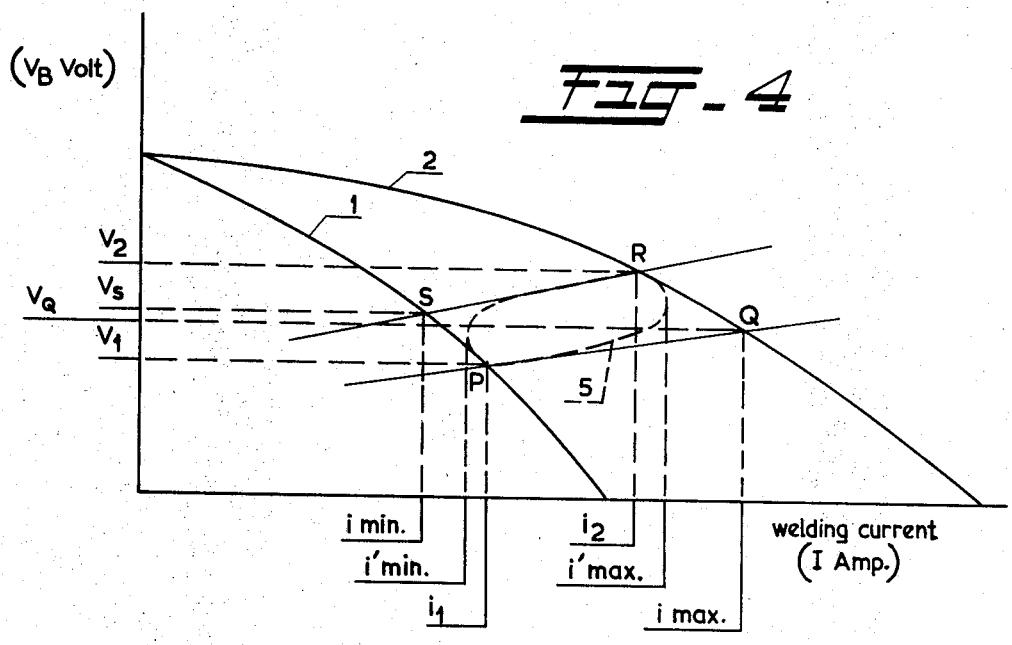
FIG. 4 shows voltage-current curves of the power supply in the process according to the invention with a constant electrode supply rate.

FIG. 4 shows the operation of the process according to the invention in using a constant electrode supply rate and a power source with decreasing characteristic.

Curve 1 shows the relation between the current and the voltage of the power source during the interval with low current intensity. Curve 2 shows the relation between the current and the voltage during the interval with high current intensity.

The line PQ represents the arc properties at an arc length corresponding with a stationary condition as denoted by P, whereas the line SR represents the arc properties at an arc length corresponding with a stationary condition as denoted by R of the curve 2.

Assuming the process is being followed from point P on the curve 1. The basic current at this point is $i_1$ and the basic voltage is $V_1$. If suddenly a point on curve 2 is chosen, the arc current will change to $i_{max}$ and the arc voltage to $V_q$, according to point Q. As the supply rate is now too low for the current intensity $i_{max}$, the working point will travel from Q to R along the curve 2 until a stationary condition has been obtained with corresponding current intensity $i_2$ and arc voltage $V_2$.

After termination of the current peak it will be switched over to the feeding curve 1. If this is again effected without inertia, the working conditions of the arc will be such that a current intensity $i_{min}$ and voltage $V_s$ on the curve 1 are obtained according to point S. The supply rate is now too high for the current intensity $i_{min}$ causing the length of arc to decrease until a stationary condition has been obtained at low current intensity in point P.

Depending on the speed at which a change can be made from the curve 1 to the curve 2, curves as are denoted by curve 5, can be traversed in the area PQRS. The welding current can then reach the maximum values of $i_{max}$ and $i_{min}$ respectively. The current peak can produce a maximum effect if the change from curve 1 to curve 2 is effected as quickly as possible.

The switching device has been constructed in such a way that the change from the high level to the low level takes place according to a set time factor, so that the return movement of the arc from the lower part of the seam, after the seam has been filled during the interval with low current intensity, takes place gradually, because of which material is supplied during the rising solidification front.

Figure 5:
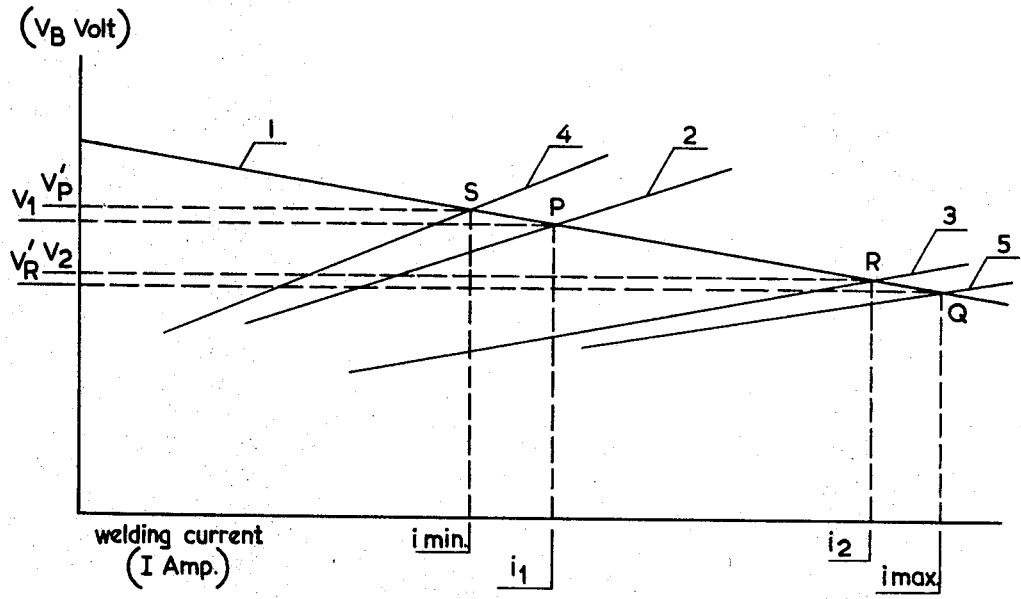
FIG. 5 shows voltage-current curves of the arrangement in the process according to the invention.

FIG. 5 shows the operation in a process with a variable power supply and a power source with a constant voltage.

Curve 1 shows again the correlation between current and voltage occurring in said process. The voltage decreases by about 1½ volts per 100 amperes increasing current.

The lines 2 and 3 show the characteristics of the arc in positions P and R respectively. Position P denotes the stationary position during the interval with low current intensity and position R denotes the stationary position in the interval with high current intensity.

The process may be followed from the condition P with current intensity $i_1$ and arc voltage $V_1$. On increasing the electrode supplying speed the adjustment moves towards the position R with current intensity $i_2$ and arc voltage $V_2$. On decreasing the welding speed, the process is reversed.

When the electrode supply mechanism is insufficiently damped, that stationary position may be exceeded both when changing to the interval with high and to the interval with low current intensity. This is denoted in the figure by the position Q with current intensity $i_{max}$ and arc voltage $V'_R$ and the position S with the current intensity $i_{min}$ and arc voltage $V'_P$. The installation has been constructed in such a way that a certain required damping upon decreasing the welding speed can be obtained.

Figure 6:
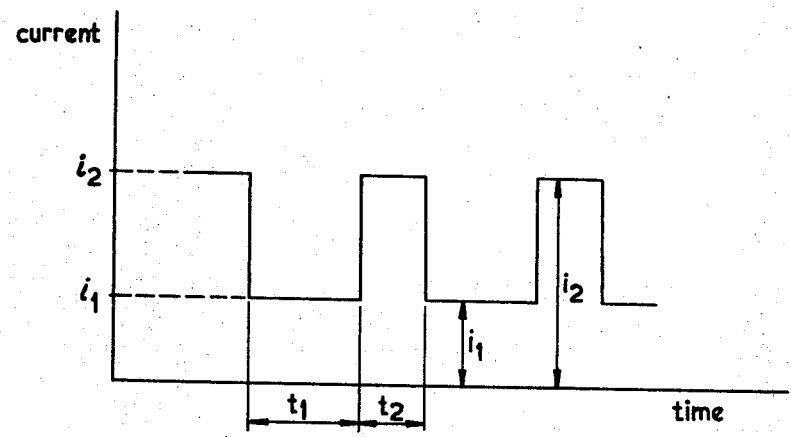
FIGS. 6 and 7 show wave forms of the welding current to the invention.
Figure 7:
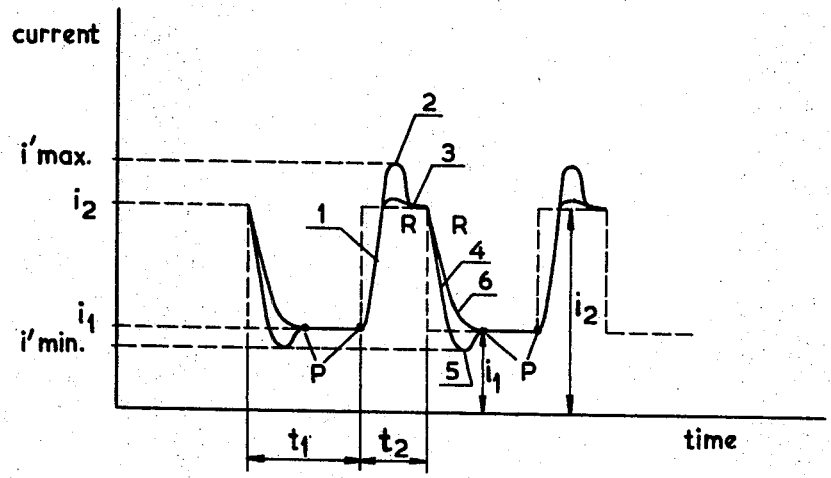

The FIGS. 6 and 7 show welding current cycles of the process according to the invention. In FIG. 6 the durations of the intervals $T_1$ and $T_2$ are schematically shown with the low current intensity $i_1$ and the high current intensity $i_2$ respectively.

FIG. 7 shows a true wave form of the welding current according to the process of the invention. The leading edge 1 shows the transition from low to high current intensity. The peak 2 occurs at a very steep leading edge due to inertia in fusing the electrode material when adjusting to a greater length of arc.

Part 3 of the curve is the stationary condition at current intensity $i_2$. Part 4 of the curve shows the transition to the low level. The peak 5 occurs underneath the stationary level $i_1$ when the change from the high to the low level is effected very quickly. When the change is made in a gradual way, said change being made from the high to the low level, the curve 6, for instance, may be traversed.

I claim:

1. A process for arc welding elements by means of a consumable electrode in a single pass comprising the steps of providing a groove between the elements to be welded, said groove having an upper V-portion and an adjoining lower abutting portion; firing an electric arc between the consumable electrode and the groove; varying the welding current according to a predetermined curve with alternating intervals of high and low current intensity during the movement of the electric arc along the groove, the total cycle duration comprising one interval with high current intensity and one interval with low current intensity lasting between approximately 0.2 second and approximately 5 seconds; said abutting portion of the groove being welded during the interval with high current intensity and said V-portion of the groove being welded during the interval with low current intensity.

2. A process according to claim 1, employing a power source providing a constant electrode supply rate, wherein current peaks of the welding current are obtained by varying the internal resistance of the power source.

3. A process according to claim 1, employing a constant voltage supply source, wherein current peaks of the supply current are obtained by varying the electrode supply rate.

4. A process according to claim 2, wherein the welding current traverses a closed curve between two separate curves in the voltage characteristic of the power source and two separate straight lines indicating the correlation between the current and the voltage when changing from one curve to the other.

5. A process according to claim 3, wherein the welding current varies according to the straight line indicating the correlation between the current and the voltage of the power source.

6. A process according to claim 1, wherein said elements comprise two sheets between which a V-seam with a vertical remaining portion is to be welded; the current intensity in the interval with high current intensity being sufficient for a complete penetration of said vertical portion.

7. A process according to claim 1, wherein said elements comprise two sheets between which a V-seam with vertical remaining portion is to be welded; the current intensity during the interval with low current intensity being sufficient for filling up the upper part of the V-seam.

8. A process according to claim 1, wherein the interval with high current intensity is of shorter duration than the interval with low current intensity.

9. A process according to claim 1, wherein said elements are sheets with a thickness of at least 25 mm., the ratio between maximum and minimum current intensity being more than 2.

10. A process according to claim 1, wherein said elements are sheets with a thickness of at least 25 mm., the average current intensity being less than half the current intensity in welding the same sheets by means of a process with several succeeding arcs with the same traveling speed of the arcs across the workpiece.

11. A process according to claim 1, wherein taking into account the duration of the intervals and the welding speed, the average welding current is less than half the welding current in welding the same elements at the same welding speed and using a conventional constant welding current and one or more welding arcs.

12. A process according to claim 1, wherein the average value of the welding current decreases as the current intensity during the interval with high current increases.

13. A process according to claim 3, wherein the ratio between the duration of the interval with high current intensity and the duration of the interval with low current intensity decreases as the current intensity during the interval with high current intensity increases.

14. A process according to claim 3, wherein the traveling speed along said path and the frequency of the intervals with high and low current intensity are increasing as the current intensity during the interval with high current intensity is increasing.

15. A process according to claim 1, wherein the duration of the transition from the low current level to the high current level is less than 0.1 second.

16. A process according to claim 1, wherein the length of said lower abutting portion of the groove is considerably greater, to about half the element thickness, than in welding two elements with an equal thickness and using a constant welding current.

17. A workpiece made by the application of the process according to claim 1.

References Cited
UNITED STATES PATENTS

| | | | |
|---|---|---|---|
| 3,130,295 | 4/1964 | Manz | 219—131 |
| 3,288,982 | 11/1966 | Suzuki et al. | 219—137 |
| 3,330,933 | 7/1967 | Maklary | 219—135 X |
| 3,409,756 | 11/1968 | Manz | 219—130 |

ANTHONY BARTIS, Primary Examiner

C. L. ALBRITTON, Assistant Examiner

U.S. Cl. X.R.

219—130